United States Patent [19]

Collier et al.

[11] 4,119,124
[45] Oct. 10, 1978

[54] METHOD AND TOOL FOR APPLYING TIES

[75] Inventors: John Covell Collier; Leonard John Owen, both of Exeter, England

[73] Assignee: AMP Incorporated, Harrisburg, Pa.

[21] Appl. No.: 793,661

[22] Filed: May 4, 1977

[30] Foreign Application Priority Data

May 25, 1976 [GB] United Kingdom ............... 21519/76

[51] Int. Cl.² ............................................. B21F 9/02
[52] U.S. Cl. ............................... 140/93.2; 140/123.6
[58] Field of Search .................... 140/93 A, 93.2, 123, 140/123.5, 123.6; 100/33 PB

[56] References Cited

U.S. PATENT DOCUMENTS

| | | | |
|---|---|---|---|
| 3,515,178 | 6/1970 | Hidassy | 140/123.6 |
| 3,578,157 | 5/1971 | Hidassy | 140/93.2 UX |
| 3,633,633 | 1/1972 | Countryman | 140/93.2 |
| 3,891,012 | 6/1975 | Bakermans | 140/93 A |
| 3,946,769 | 3/1976 | Caveney et al. | 140/93.2 |
| 3,976,108 | 8/1976 | Caveney et al. | 140/93 A |
| 4,004,618 | 1/1977 | Turek | 140/93.2 |

FOREIGN PATENT DOCUMENTS 2,414,106  10/1974  Fed. Rep. of Germany .......... 140/93.2

*Primary Examiner*—E. M. Combs
*Attorney, Agent, or Firm*—Allan B. Osborne

[57] ABSTRACT

A tool for applying ties to bundles comprises a magazine chamber leading directly to the path of a reciprocable carriage adapted on forward movement to engage the leading tie in the magazine and drive it into a loop guide releasably disposed about a bundle. The tie tail is reversed about the bundle by the loop guide under the driving force of the carriage to pass through the head of the tie in a reverse direction to engage a gripper in the carriage. Reversal of the carriage tensions the tie about the bundle and repositions the carriage in a starting position in relation to the magazine. A shear device operating transversely of the carriage path and disposed at its forward end severs the tie tail adjacent the tie head, and opens the loop guide for removal of the bundle.

30 Claims, 14 Drawing Figures

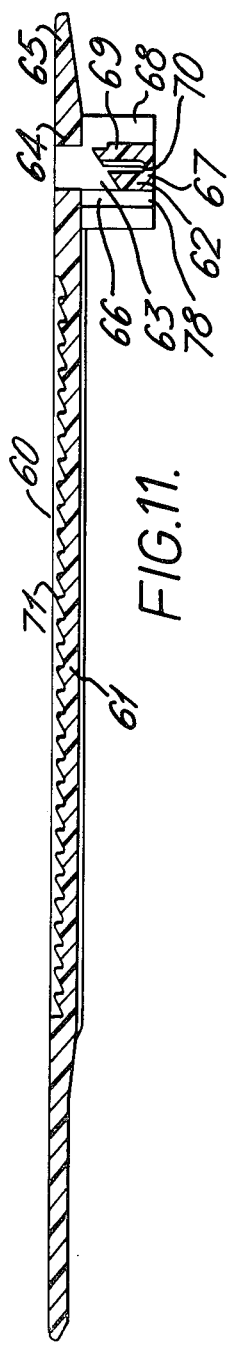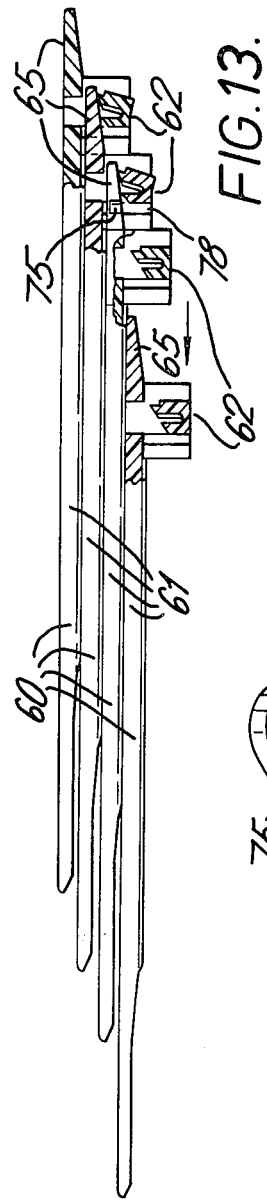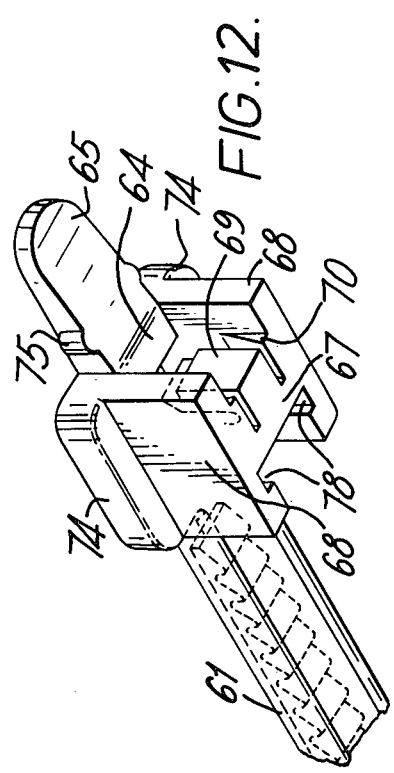

METHOD AND TOOL FOR APPLYING TIES

This invention relates to tools for applying bundle ties of the kind having a flexible strap portion extending from an apertured frame adapted for the passage of the free end of the strap. Such ties are extensively used for tying electrical cables into bundles. The invention also concerns a method of applying such ties and is particularly, but not exclusively, concerned with the use of a tie of the kind forming the subject matter of our copending, concurrently filed, patent application Ser. No. 793,595 filed May 4, 1977 U.S. Pat. No. 4,079,485.

Tools for applying ties are known but generally they require the packaging of ties in a disposable cartridge or magazine which holds the ties in radially extending arcuate pattern. Such tools also require means for transposing individual ties from such an arrangement into the guide path of a ram of the tool. In one such arrangement the ties are indexed around the cartridge and then transposed laterally into the guide path. In another arrangement the cartridge is disposed remote from the tool and individual ties are driven along a hose by pneumatic pressure.

It is an object to provide a tool and a method of operation which obviates the need for a disposable cartridge and allows ties to be fed directly into the path of a tie driving member.

According to the present invention, a method of applying a bundle tie having a flexible strap extending from an apertured frame for the passage of the strap looped back on itself comprises arranging a plurality of ties in a stack with strap portions in generally parallel overlapping relationship and extending forwardly from their frame portions arranged in a row at a side of the stack, positioning the stack adjacent the guide path of a reciprocable carriage with the frame of an end tie in the guide path and the strap portion extending forwardly, driving the carriage forwards to engage and drive the end most tie forwardly, lengthwise to loop the strap about a bundle and feed it back through the frame, gripping the reversed leading end of the strap in the carriage, reversing the carriage to tighten the loop, shearing the free end of the strap adjacent the frame, withdrawing the carriage behind the frame of the tie in the stack and moving the stack towards the guide path.

Suitably the ties are arranged in an inclined stack, the frame portions being arranged in staggered overlapping relationship to define a row inclined to the strap portions and to the carriage guide path.

Preferably the carriage in its reverse movement is released from the free end of the gripped strap on application of a predetermined tie tension and before shearing the strap portion.

Suitably the tie is so designed that the pulling stress of the carriage on the tie exceeds the failure stress of the tie at a position close to the strap tip at a tension corresponding to a suitable bundling tension so that the tip severs from the remaining strap portion automatically. This not only permits an advantageous control on the maximum bundling tension but also allows simplification of the tool mechanism.

The invention includes a tool for applying to a bundle a bundle tie having a flexible strap extending from an apertured frame for the passage of the strap looped back upon itself, the tool comprising a chamber for a plurality of ties arranged in a stack with their straps in generally parallel overlapping relationship extending forwardly from their frames arranged in a row, the chamber opening to the guide path of a reciprocable carriage and being adapted to guide the ties directly into the guide path with the strap of the leading tie extending lengthwise forwardly of, and its frame being disposed in, the guide path, a releasable loop guide adapted to embrace the bundle and guide the strap about the bundle and reverse it through the frame, a gripper in the carriage to grip the strap, a shear device movable transversely of the guide path adjacent the loop guide, and means for reciprocating the carriage between a rear side of the chamber and the loop guide.

Preferably the chamber defines a tie guide converging forwardly with the rectilinear guide path and adapted to guide a plurality of ties arranged in an inclined stack with their strap portions in overlapping relation and projecting forwardly from the tie frames, generally parallel to the rectilinear guide path, the tie frames being staggered in overlapping manner to define a row of frames inclined to the strap portions, the tie guide path intersecting the rectilinear guide path at an aperture in the tool frame for passage of the tie frames into the guide path.

Suitably the tie guide of the magazine chamber engages frame portions of the ties of the stack and defines a guide path inclined forwardly and downwardly towards the frame aperture. The magazine chamber is provided with biasing means at the tool frame aperture and arranged to engage the tie frames successively as they approach the aperture on sides of the tie frames remote from the rectilinear guide path of the carriage to urge them through the aperture into the guide path. Suitably the biasing means is formed with a tie-frame engaging surface inclined forwardly towards the rectilinear guide path more steeply than the tie guide.

A cantilever leaf spring is suitably supported rearwardly of the tool frame aperture and extends forwardly over a rear portion of the aperture to engage the rear side of the foremost tie frame to resist its reverse movement on retraction of the carriage.

The carriage is suitably formed at its forward end with a pair of forwardly projecting feed prongs adapted to engage a tie frame at opposite sides of the guide path and spaced apart to admit passage of the reverse leading end of a tie strap between them.

Guide grooves are suitably formed on opposite sides of the rectilinear guide path leading forwardly from the tool frame aperture and are arranged to engage side portions of a tie frame, the guide grooves being inclined forwardly into the guide path and adapted accurately to position the tie frame in the guide path.

The releasable gripping means for gripping the reversed leading end of a tie strap portion is suitably disposed in a cavity at the forward end of the carriage and comprises a pivoted member formed with a gripping portion on a side movable by pivotal action towards and away from a roof of the cavity. The tip of the reversed strap portion of the tie is received between the roof of the cavity and the gripping portion of the pivoted member.

The shear device mounted at the forward end of the tool frame is slidable transversely of the rectilinear guide path and suitably includes an extension arranged on shearing operation to engage a pivotal portion of the loop guide to open the loop guide and permit removal of a tied bundle. The shear device is suitably biased to a normal position in which the shear blade is withdrawn from the rectilinear guide path and is operated by a pivoted lever which at one end engages the shear device and at the other is arranged to engage the carriage, when in its withdrawn position, in a manner such that on withdrawn of the carriage the lever pivots to operate the shear device.

The shear device extension may comprise a pair of arms, one on each side of the rectilinear guide path, and spaced apart to admit passage of a tie frame between them.

The invention will now be described by way of example with reference to the accompanying partly diagrammatic drawings, in which:

FIG. 1A is a fragmentary section taken on line A—A of FIG. 1, viewed in the direction of the arrows of a side portion of the tool frame;

FIG. 11 is a partly sectioned side elevation of a cable tie suitable for use in the tool of FIGS. 1 to 11;

FIG. 12 is a fragmentary perspective view of a frame portion of the tie of FIG. 11; and FIG. 13 is a fragmentary partly sectioned view of a stack of the cable ties of FIGS. 11 and 12.

Figure 1:
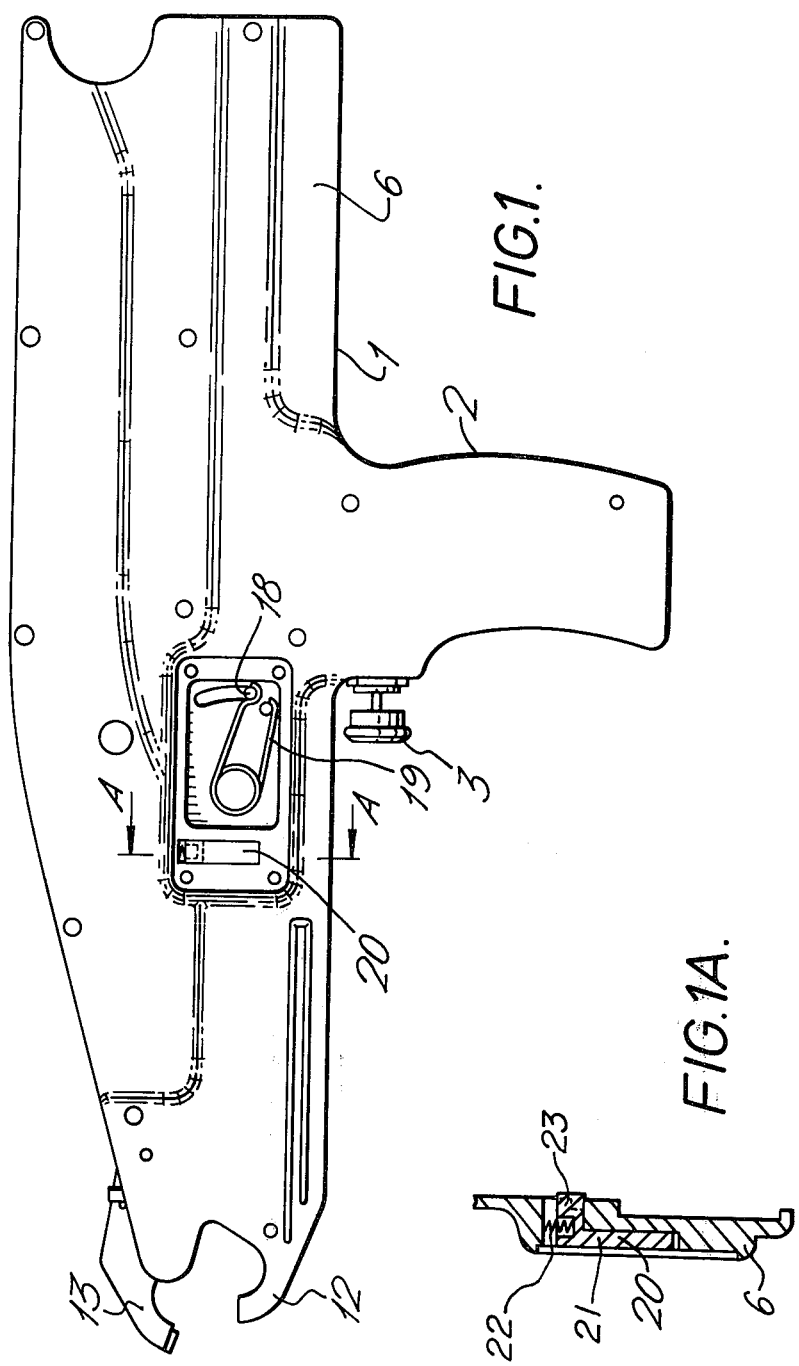
FIG. 1 is a side elevation of a tool according to the invention.

The tool of FIGS. 1 to 7 comprises a frame 1 having a dependent pistol-grip handle 2 carrying a finger operated plunger device 3 incorporating a pneumatic valve 4 adapted selectively to control the supply of pneumatic fluid to either end of a double acting piston and cylinder device 5 mounted within the frame 1. The frame 1 is moulded in two halves 6, each comprising a side of the tool, and releasably secured together by fasteners. At the rear, right hand end of the tool as seen in the drawings, the frame 1 projects above the piston and cylinder device 5 to define a tie magazine chamber 9 extending forwardly to the front of the tool. The tool sides 6 are formed with groove guides 8 at the base of the chamber 9 which at the rear end of the tool have an enlarged entry 10 and extend forwardly in progressively increasing downwardly inclined manner towards a middle portion of the tool, forwardly of the cylinder of device 5.

The tool at its forward end is provided with a pair of bundle jaws 12, 13, a lower jaw 12 integral with the tool frame 1 and an upper jaw 13 pivotally connected at 14 to the frame 1 for opening and closing movement in relation to jaw 12. The jaw 13 is biased into a closed condition, in anti clockwise fashion by biasing springs 19 acting through levers 17 and a transverse shear device to be described below.

Figure 6:
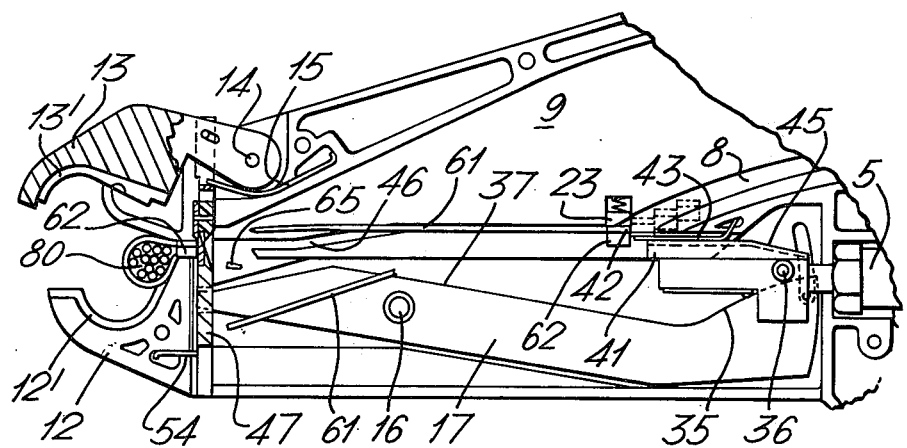
Figure 7:
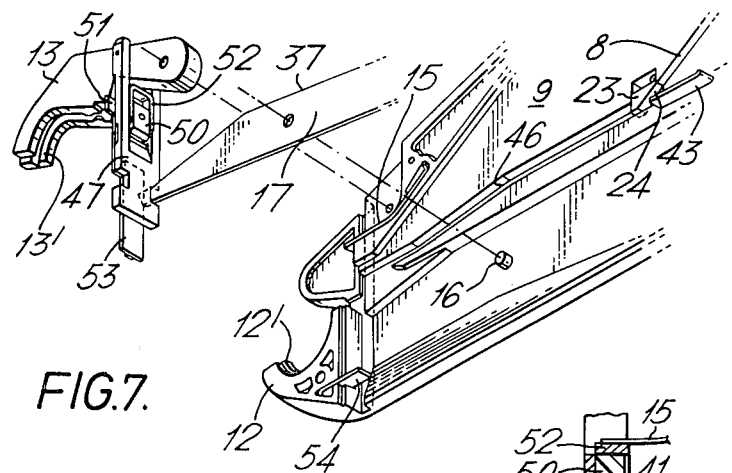
FIG. 7 is a fragmentary exploded view of a forward portion of the tool exposing the shear mechanism.

A pivot 16, defined by bosses on the frame halves as seen in FIG. 7, extends internally of the frame 1 between the opposite sides 6 at a location forwardly of the piston and cylinder device 5 and slightly below the line of action thereof. A pair of identical plate-like levers 17 is pivotally mounted on pivot 16, extending rearwardly towards cylinder device 5, spaced apart, one on each side of the frame 1 and at rear ends having pins 18 outwardly directed through arcuate slots in the frame and engaging external biasing springs 19 as seen in FIG. 1, adapted to bias the levers 17 counter-clockwise about pivot 16. The springs 19 are disposed in recesses suitably closed by cover plates, not shown, and forwardly of the springs 19, within the same recesses, are disposed further biasing means 20 at the opposite sides of the tool. Each means 20 comprises a block 21 slidable in a slot, vertically as seen in FIG. 1A, transversely of the line of action of the piston and cylinder device 5 and biased downwardly by a compression spring 22. An upper block portion 23 projects through an aperture in the tool side to register with a leading end of the corresponding groove guide 8, as seen in FIGS. 3 to 7, and presents a forwardly and downwardly inclined lower guide surface 24 to the groove guide, suitably inclined more steeply than the groove guide 8.

Figure 3:
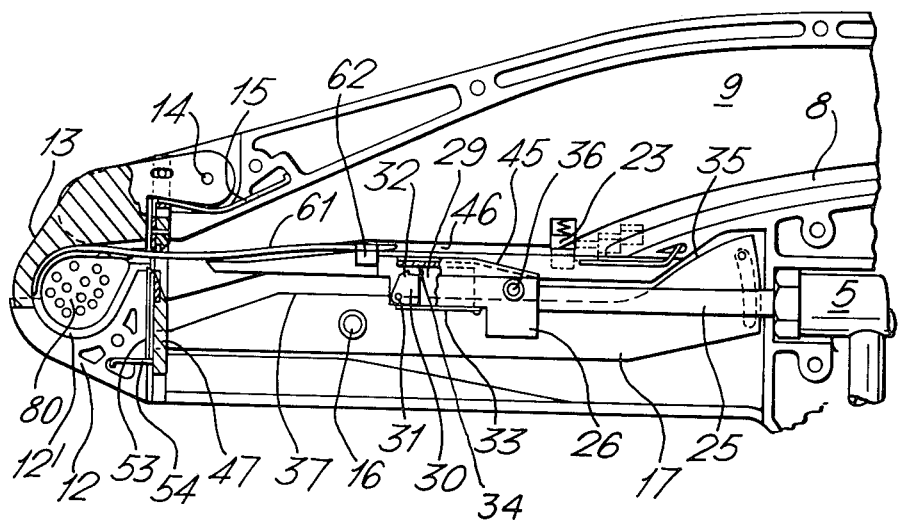
FIGS. 3 to 6 are fragmentary side elevations similar to part of that of FIG. 2 but to an enlarged scale and with the tool mechanism in successive stages of operation.

The ram 25 of the piston and cylinder device 5 is coupled within the tool frame to a carriage 26 rectilinearly slidable longitudinally of the frame and between the spaced levers 17. The carriage 26 at its forward end is formed with an inverted channel-shaped cavity 29 within which is pivotally mounted a gripping member 30 on a transverse pivot pin 31. The member 30 has a tooth 32 movable towards the roof 34 of the cavity 29 by counter-clockwise pivotal movement as seen in FIG. 3, with the tooth 32, when in its uppermost position, being disposed rearwardly of the pivot 31. A lower side of member 30 engages the forward end of a cantilever spring 33 extending from a rear portion of the carriage and arranged to bias the gripping member counter-clockwise about pivot 31 to a gripping condition in relation to the cavity roof. Th spring 33 is suitably slotted to present an open floor to the cavity 29.

The carriage 26 at a forward end of the cavity 29 and adjacent the cavity roof is formed with a pair of feed prongs 41, one on each side of the cavity, and, as seen in FIG. 6, disposed below an aperture 42 in the frame 1 communicating with the forward ends of the groove guides 8. A cantilever leaf spring 43 secured at its rear end extends forwardly above the forward end of the carriage, when in the rearmost condition of FIG. 6, and part way across the aperture 42. The inwardly projecting block portions 23 and their lower guide surfaces 24 register with the groove guides 8 above the aperture 42, forwardly of the spring 43. The carriage 26 is formed at the upper side of its rear end with an upwardly and forwardly inclined cam surface 45 for deflecting the tie head upwardly out of its path on rearward movement. Guide grooves 46 are formed in opposite sides 6 of the frame 1 and extend forwardly from the aperture 42 at a location above the feed prongs 41 in their FIG. 6 condition, to the forward end of the tool to intersect the path of a transversely operable shear and stop member 47. The grooves 46 have forwardly and downwardly inclined middle portions, leading to forward portions aligned with the path of the feed prongs 41. The grooves 46 have lower sides which terminate short of the shear and stop member 47 by at least the length of a tie frame to facilitate clearing the tool in the event of a misfeed. The sides of the frame 1 at the grooves 46 are spaced by a slot extending forwardly from the aperture 42 at which the magazine chamber 9 opens to the guide path of the carriage 26 for the passage of strap portions of ties from the magazine into the guide path.

The shear and stop member 47 is slidably supported in a vertical guide within the frame 1 for limited up and down movement. As shown in FIG. 7, forward ends of levers 17 engage slots in opposite sides of member 47, for lifting and lowering the member by movement of the levers 17 about pivot 16. Upper portions of the member 47 are pivotally connected to the upper jaw member 13, forwardly of its pivot, for opening the jaw 13 on upward movement and closing it on downward movement of member 47. The lever biasing springs 19 serve to bias the shear member 47 downwards and the upper jaw 13 to a closed condition. The levers 17 have at their rear ends upper, forwardly and downwardly inclined surfaces 35 arranged to be engaged by pins 36 projecting from the carriage 26, on movement of the carriage to its rearmost, FIG. 6, condition, to drive the levers 17 against the biasing springs 19 in a clockwise direction to elevate the member 47 and open the upper jaw 13. The levers 17, forwardly of surfaces 35 are formed with rectilinear surfaces 37 extending forwardly of the pivot 16 and serving to engage the pins 36 on forward movement of the carriage 26. The pins 36 suitably carry rollers for engaging the levers 17.

The shear and stop member, as more closely seen in FIGS. 7 to 10, comprises a frame having an aperture 48 generally aligned with the forward ends of the guide grooves 46 and the path of the feed prongs 41 of the carriage 26. A shear blade 49 is mounted in the frame at a lower side of the aperture 48, and at an upper side is disposed a block 50 of resilient plastics material, slidable relative to the frame of the shear member but secured to a mounting plate 51 disposed at a forward side of the member 47 and having side ears locating in grooves in the tool frame sides 6 to secure the block 51 against movement. The mounting plate 51 is formed with an aperture opposed to the shear blade for passage of tie heads and defining a shear anvil. A pawl member 51 is slidably mounted on the block 50 for up and down movement within the member 47, and has a pair of dependent legs, one on each side of the block 50 formed with lower forwardly and downwardly inclined chamfers disposed at each side of the aperture 48. The pawl 52 is biased downwards against the block 51 by a spring 15.

Figure 8:
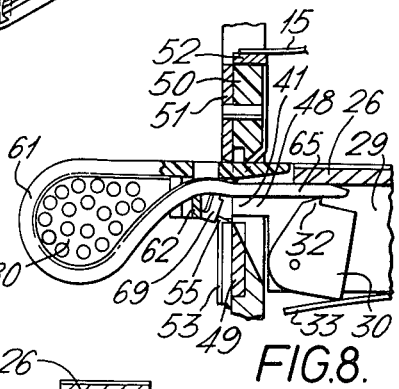
FIG. 8 is a fragmentary sectional side elevation of a leading portion of the tool to an enlarged scale and corresponding to the stage of operation shown in FIG. 4.

At a forward side of member 47 extending downwardly from aperture 48 is disposed a latch plate 53 vertically slidable relative to member 47 and supported at its lower end on a cantilever spring 54 normally supporting the upper end 55 of the latch plate slightly above the shear blade when member 47 is in its lower, FIG. 8, condition. Upward movement of the latch plate 53 is suitably limited by a projection engaging a stop in the tool frame. The upper end 55 is chamfered upwardly on its rear side at a shallow angle and the pawl member 52 and block 50 are chamfered on their rear sides at the aperture 48 to present a forwardly convergent throat at the aperture 48 in alignment with the path of the feed prongs 41. The throat provides a passage for ties into the loop guide defined by the jaws 12 and 13.

Figure 4:
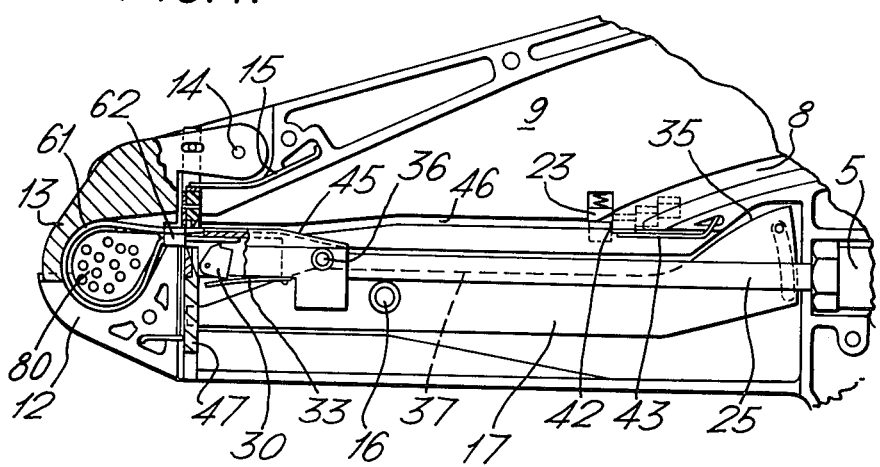
Figure 5:
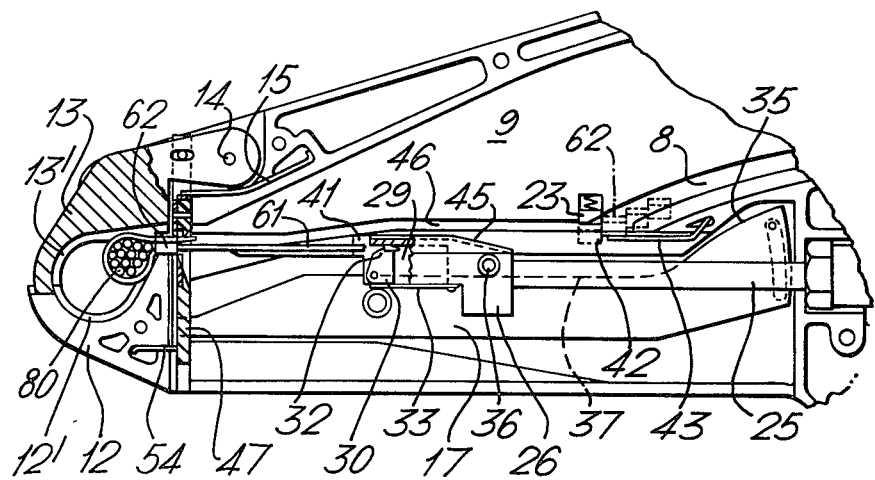

The tool jaws 12 and 13 are formed on their inner sides with guide grooves 12', 13' adapted to form, when the jaws 12 and 13 are closed as in FIGS. 3 to 5, a loop of grooved form extending from the throat or aperture 48 with the guide path of the feed prongs of the carriage 26 extending generally tangentially of an upper side of the loop.

FIGS. 11 to 13 illustrate a cable tie for use in the tool described above and which forms the subject of our concurrent copending application Ser. No. 793,565 filed May 4, 1977 U.S. Pat. No. 4,079,485.

The tie 60 comprises a one-piece moulding of flexible insulating material having a strap portion 61 formed at one end with a frame 62 forming a passage 63 for the other, free end of the strap 61 when the strap is folded or looped back upon itself. The frame has a floor 64 or base which on one side is coplanar with the strap and the frame projects from the other lower side of the strap 61 as seen in FIGS. 11 and 13. The frame 62 is of open box-like structure, as seen in FIG. 12, and on the side opposite the strap 61 is formed with a tongue 65 generally forming an extension of the strap 61 and floor 64. The frame 62 is formed on its face adjacent the root of the strap 61 with an aperture 66 disposed between the floor 64 and a head 67 of the frame and defining an entrance to the passage 63. The frame 62 is formed with opposite side walls 68 extending beyond the head 67 towards the tongue 65 and also on the opposite side of the head 67. A resilient latch 69 is formed between the walls 68, on the side of the head 67 remote from the strap 61, integrally joined to the head 67 by a resilient hinge portion 70 and projecting into the passageway to define a pawl for engaging ratchet teeth 71 formed in the strap 61 on the opposite side to that from which the frame projects.

The floor 64 extends outwardly of the side walls 68, as seen in FIG. 12, the define narrow side flanges 74, which, at the tongue end, terminate flush with ends of the frame walls 68. The tongue 65 is formed with a chamfered end and with transverse ribs 75 on opposite sides adapted to snap-fit in the passage 63 of a complementary tie frame in the manner shown in FIG. 13. The side walls 68 on the side of the head remote from tongue 65 are formed on their facing sides with grooves 78 for receiving the ribs 75 of a complementary tongue 65.

The ratchet teeth 71 terminate short of the free end of the strap 61 which end is reduced in thickness.

For use in the tool of FIGS. 1 to 10, a plurality of ties is suitably packaged in a stack as seen in FIG. 13 with the tongues 75 of lower ties snap-fitting into the frame apertures of super-adjacent ties and with consecutive strap portions extending in parallel overlapped fashion. The frame portions 62 of adjacent ties project downwardly in closely spaced overlapping fashion to define a sloping stack which is flexible to correspond to the path defined by the guide grooves 8 of the tool magazine chamber.

The stack of ties 60 of FIG. 13 is loaded into the magazine from the upper right hand end as seen in FIG. 1 with strap portions 61 foremost and with the frames 62 directed downwardly as in FIG. 13.

Figure 2:
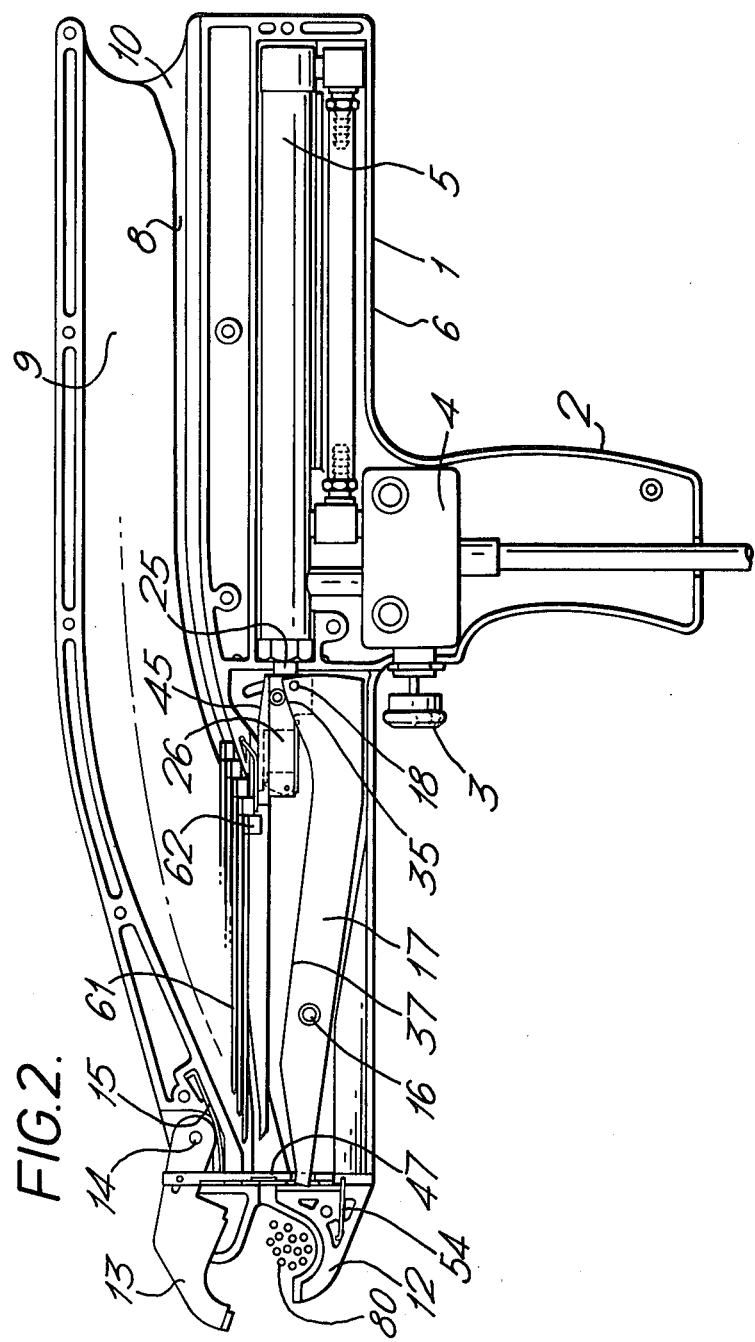
FIG. 2 is a side elevation of the tool of FIG. 1 with a side removed to expose the tool mechanism in an initial condition of operation.

As seen in FIG. 2, the guide ribs 74 are disposed in the groove guides 8. The strap portions 61 are of length to extend from the aperture 42 to a position short of the rear of the shear and stop member 47 as indicated in FIG. 2. The lowermost tie in the stack has its frame 62 registered with the aperture 42 forwards of the spring 43 and in the path of the forward ends of the feed prongs 41.

The lower guide surfaces 23 of blocks 21 engage the head 62 of the leading, lowermost tie 60 to urge the head downwardly through the aperture 42 and past the end of spring 43. In this condition, the lower side of the head 62 of the succeeding, superposed tie 60 engages the upper side of spring 43.

To operate the tool from the FIG. 2 starting condition, the open bundle jaws are positioned about a bundle of cables 80 and the finger plunger 3 is depressed to open the supply of pneumatic pressure fluid through valve 4 to the rear of the piston and cylinder device 5 to drive the ram 25 and carriage 26 forwards to the FIG. 3 condition. The feed prongs 41 drive the leading tie 60 forwards to withdraw its tongue 65 from the frame aperture of the preceding tie. The ribs 74 of the leading tie engage the guide groove 46 which serve to lower the head 62 of the tie, as it moves forwards, until the tongue 65 is positioned between the feed prongs 41. As the tongue 65 is drawn from the frame of the preceeding tie, the frame of the preceding tie is drawn forwardly of the spring 43 and driven into the aperture 42 by the biasing action of surfaces 24 of blocks 21 after the carriage 26 has moved forwards.

The pins 36 move forwards with the carriage 26, disengaging from the lever surfaces 35, and allowing the levers to move counter-clockwise about pivot 16 under the bias of spring 19 to lower the device 47 and close the upper bundle jaw 13 about the bundle 80. The leading end of the tie strap 61 is driven between opposite sides of the shear and stop member 47, above the lowered shear blade 49 through the aperture 48 and against the upper bundling jaw 13, into its guide groove 13', which deflects it downwardly.

Continued forward movement of the ram 25 to the FIG. 4 condition drives the leading end of the tie strap 61 around the loop path defined by the bundling jaws 12, 13 to engage the strap underside at a location close to the head 62. Simultaneously the head enters between the sides of the shear and stop member to elevate the pawl member 52, and deflect the latch plate 53 against its spring as the head passes through aperture 48. As soon as the head 62 clears aperture 48, the spring 54 lifts the latch plate to engage behind pawl 69 of the head 62, and the side portions of the pawl member 52 are urged down behind the ribs 74 under the bias of spring 15, on each side of the tie tongue 65 to stop the head 62 against rearward movement.

The leading end of the tie strap 61 enters the head aperture 66 and passes through the passage 63, the aperture 48 above the shear blade 49, and between the feed prongs 41 to a location below the roof 34 of the cavity at the forward end of the carriage 26 where it is gripped by the tooth 32 of gripping member 30 under the bias of spring 33.

Figure 9:
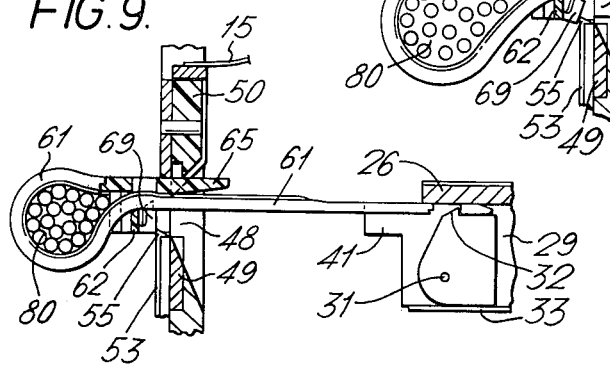
FIGS. 9 and 10 are views similar to that of FIG. 8 but in stages of operation corresponding to those of FIGS. 5 and 6 respectively.

The carriage 23 is now in its fully forward position, and the finger plunger 3 is released to open the supply of pneumatic pressure fluid through the valve 4 to the forward end of the piston and cylinder device 5 to start withdrawing the ram 25 and the carriage 26 is driven rearwardly to the FIG. 5 condition. The leading end of the tie strap 61 is gripped in the leading end of the carriage 26, and the tie head 62 is held by latch 55 and the pawl 52 so the tie is tightened about the cable bundle 80 until the tension in the tie exceeds a value determined by the failure strength of the tip of the tie strap. When this is exceeded the tie tip is severed as seen in FIGS. 5 and 9 and the strap 61 is secured in the head 62 by action of the pawl 69 against the teeth 71 in the strap 61. The tip of the latch plate 53, engaging behind the pawl 69, serves to resist tilting of the tie frame about pawl 52 under loop tension and also to resist flexure of the pawl away from the head and thereby reduce relaxation of the tie loop when the tip is severed.

Figure 10:
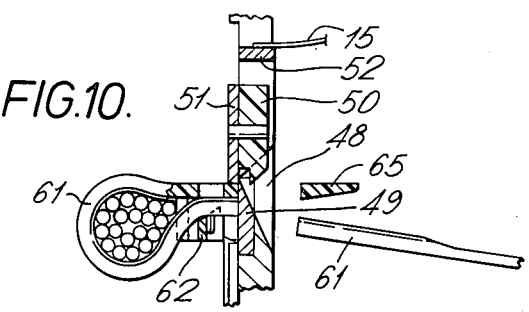

Further withdrawal of the ram 25 effects engagement of the pin 36 of the carriage 26 with the lever surface 35 to move the levers clockwise about pivot 16 to elevate the shear block 56 to sever the leading end of the tie strap 61 and the tongue 65 adjacent the head 62, as seen in FIG. 10. Elevation of the shear and stop member 37 simultaneously effects opening of the bundling jaws 12, 13 to release the tied bundle 80.

The shear blade enters the recess at the forward side of the anvil and the rear side of the anvil serves to deflect the sheared portions of the tongue 65 and strap portion downwards through an open slot in the tool frame.

The carriage is withdrawn, deflecting the leading tie head 62 upwards from the path by cam surface 35, to position the feed prongs 41 below the leading end of spring 43, and the next leading tie head 62 is urged downwards by lower guide surfaces 23 of blocks 21 into the aperture 42 to register with the feed prongs 41. The tool is now restored to the starting condition of FIG. 2, and the operational sequence may be repeated to effect a further tying operation at a different location. On the next cycle of operation, when the tool reaches the stage of FIG. 4, the tip of the tie strap entering the cavity between gripping member 30 and the cavity roof serves to eject the tie strap tip severed in the previous cycle which falls through the aperture in spring 30 and the slot in the tool frame.

What is claimed is:

1. A method of applying a bundle tie having a flexible strap extending from an apertured frame for the passage of the strap looped back on itself with a tool having a tie storage area, a movable carriage reciprocably positioned in a guide path and a releasable loop guide defining an internal circular path, the steps comprising:
    a. arranging a plurality of ties in a stack with the straps in generally parallel overlapping relationship;
    b. positioning the stack in the tie storage area adjacent the carriage guide path with the straps extending forwardly and with the frame of the lowermost tie projecting into the guide path;
    c. driving the carriage forwards to engage and drive the lower most tie forwardly lengthwise to loop the strap about a bundle of wires which may be positioned within the releasable loop guide, the strap following the internal circular path so as to feed the free tip thereof back through the aperture in the frame and into the carriage;
    d. gripping the tip of the strap in the carriage;
    e. moving the carriage rearwardly to tighten the loop about the bundle of wires;
    f. shearing the strap adjacent the frame;
    g. withdrawing the carriage behind the frame of the lowermost tie in the stack; and
    h. moving the stack so that the frame of the lowermost tie projects into the carriage guide path.

2. A method as claimed in claim 1, in which the ties are arranged in an inclined stack, the frame portions being arranged in staggered overlapping relationship to define a row included to the strap portions and to the carriage guide path.

3. A method as claimed in claim 1, in which the carriage in its reverse movement is released from the free tip of the gripped strap on application of a predetermined tie tension and before shearing the strap portion adjacent the tie frame.

4. A method as claimed in claim 3, in which the pulling stress of the carriage on the tie exceeds the failure stress of the tie at a position close to the strap tip at a tension corresponding to a suitable bundling tension so that the tip severs from the remaining strap portion automatically to release the carriage from the tie strap.

5. A tool for applying ties of the kind having a flexible strap portion formed at one end with an apertured frame for the passage of the other free end of the strap portion, the tool comprising a tool frame supporting a carriage in a rectilinear guide path leading to a loop guide at a forward end of the guide path, the frame including a chamber defining a tie guide converging forwardly with the rectilinear guide path and adapted to guide a plurality of ties arranged in an inclined stack with their strap portions in overlapping relationship and projecting forwardly from the tie frames, generally parallel to the rectilinear guide path, the tie frames being staggered in overlapping manner to define a row of frames inclined to the strap portions, the tie guide path intersecting the rectilinear guide path at an aperture in the tool frame for passage of the tie frames into the guide path, a slot in the frame extending forwardly from the aperture for passage of strap portions of the ties into the rectilinear guide path, the loop guide being adapted releasably to embrace material to the bundled and defining a concave guide path arranged to engage the leading end of a strap portion moving in the rectilinear guide path and deflect it around the concave path back into the rectilinear guide path, releasable gripping means at a forward end of the carriage for gripping the reversed leading end of a tie strap portion, and a shear device operable transversely of the rectilinear guide path and disposed at the forward end of the frame rearwardly of the loop guide.

6. A tool as claimed in claim 5 in which a latch device is mounted at a forward end of the tool at an entrance to the loop guide adjacent the shear device and is arranged to engage the frame of a tie fed into the loop guide to resist its rearward movement.

7. A tool as claimed in claim 6 in which the latch device includes means for engaging a resilient latching pawl of the tie to resist its rearward movement on tensioning the tie.

8. A tool as claimed in claim 5 in which the tie guide of the chamber is adapted to engage frame portions of the ties at opposite sides of the stack and comprises a pair of slots at opposite sides of the tool defining a guide path inclined forwardly and downwardly towards the frame aperture.

9. A tool as claimed in claim 5 in which the chamber is provided with biasing means at the tool frame aperture and arranged to engage the tie frames successively as they approach the aperture on sides of the tie frames remote from the rectilinear guide path of the carriage to urge them through the aperture into the guide path.

10. A tool as claimed in claim 9, in which the biasing means is formed with a tie-frame engaging surface inclined forwardly towards the rectilinear guide path more steeply than the tie guide.

11. A tool as claimed in claim 5, in which a cantilever leaf spring is supported rearwardly of the tool frame aperture and extends forwardly over a rear portion of the aperture to engage the rear side of the foremost tie frame to resist its reverse movement on retraction of the carriage.

12. A tool as claimed in claim 5, in which the carriage is formed at its forward end with a pair of forwardly projecting feed prongs adapted to engage a tie frame at opposite sides and spaced apart to admit passage of the reversed leading end of a tie strap between them.

13. A tool as claimed in claim 5, in which guide grooves are formed on opposite sides of the rectilinear guide path leading forwardly from the tool frame aperture and are arranged to engage side portions of a tie frame, the guide grooves being inclined forwardly into the guide path and adapted accurately to position the tie frame in the guide path.

14. A tool as claimed in claim 13, in which lower sides of the guide grooves terminate short of the shear device.

15. A tool as claimed in claim 5, in which the gripper means is disposed in a cavity at the forward end of the carriage and comprises a pivoted member formed with a gripping portion on a side movable by pivotal action towards and away from a roof of the cavity.

16. A tool as claimed in claim 5, in which the shear device mounted at the forward end of the tool frame is slidable transversely of the rectilinear guide path and includes an extension arranged on shearing operation to engage a pivotal portion of the loop guide to open the loop guide and permit removal of a tied bundle.

17. A tool as claimed in claim 16, in which the shear device is biased to a normal position in which the shear device is withdrawn from the rectilinear guide path and is operated by a pivoted lever which at one end engages the shear device and at the other is arranged to engage the carriage, when in its withdrawn position, in a manner such that on withdrawal of the carriage the lever pivots to operate the shear device.

18. A tool for applying to a bundle of wires or the like a bundle tie having a flexible strap extending from a frame having an aperture therein for the passage of the strap looped back upon itself, the tool comprising:
   a. a tool frame;
   b. a carriage reciprocably positioned in a guide path in the tool frame;
   c. a chamber in the tool frame for holding a plurality of ties arranged in a stack with their straps in generally parallel overlapping relationship and the apertured frames arranged in a row, said chamber being open to the guide path so that the apertured frame of the lowermost tie extends thereinto;
   d. openable loop guide means positioned on one end of the tool frame for releasably embracing a bundle of wires or the like and for guiding a strap about the bundle and back through the apertured frame;
   e. a releasable gripping means in said carriage for gripping the end of the strap extending through the apertured frame;
   f. shear means positioned adjacent the loop guide means for movement transversely of the guide path to shear a strap;
   g. means for reciprocating the carriage between a rear side of the chamber and the loop guide means whereby a bundle tie may be moved from the chamber and the strap thereof advanced around a bundle of wires or the like positioned in the loop guide means and back through the apertured frame.

19. A tool as claimed in claim 18, in which a latch device is mounted at a forward end of the tool at an entrance to the loop guide adjacent the shear device and is arranged to engage the frame of a tie fed into the loop guide to resist its rearward movement.

20. A tool as claimed in claim 19, in which the latch device includes means for engaging a resilient latching pawl of the tie to resist its rearward movement on tensioning the tie.

21. A tool as claimed in claim 18, in which the tie guide of the chamber is adapted to engage frame portions of the ties at opposite sides of the stack and comprises a pair of slots at opposite sides of the tool defining a guide path inclined forwardly and downwardly towards the frame aperture.

22. A tool as claimed in claim 18, in which the chamber is provided with biasing means at the tool frame aperture and arranged to engage the tie frames successively as they approach the aperture on sides of the tie frames remote from the rectilinear guide path of the carriage to urge them through the aperture into the guide path.

23. A tool as claimed in claim 22, in which the biasing means is formed with a tie-frame engaging surface inclined forwardly towards the rectilinear guide path more steeply than the tie guide.

24. A tool as claimed in claim 18, in which a cantilever leaf spring is supported rearwardly of the tool frame aperture and extends forwardly over a rear portion of the aperture to engage the rear side of the foremost tie frame to resist its reverse movement on retraction of the carriage.

25. A tool as claimed in claim 18, in which the carriage is formed at its forward end with a pair of forwardly projecting feed prongs adapted to engage a tie frame at opposite sides and spaced apart to admit passage of the reversed leading end of a tie strap between them.

26. A tool as claimed in claim 18, in which guide grooves are formed on opposite sides of the rectilinear guide path leading forwardly from the tool frame aperture and are arranged to engage side portions of a tie frame, the guide grooves being inclined forwardly into the guide path and adapted accurately to position the tie frame in the guide path.

27. A tool as claimed in claim 26, in which lower sides of the guide grooves terminate short of the shear device.

28. A tool as claimed in claim 18, in which the gripper means is disposed in a cavity at the forward end of the carriage and comprises a pivoted member formed with a gripping portion on a side movable by pivotal action towards and away from a roof of the cavity.

29. A tool as claimed in claim 18, in which the shear device mounted at the forward end of the tool frame is slidable transversely of the rectilinear guide path and includes an extension arranged on shearing operation to engage the pivotal portion of the loop guide to open the loop guide and permit removal of a tied bundle.

30. A tool as claimed in claim 29, in which the shear device is biased to a normal position in which the shear device is withdrawn from the rectilinear guide path and is operated by a pivoted lever which at one end engages the shear device and at the other is arranged to engage the carriage, when in its withdrawn position, in a manner such that on withdrawal of the carriage the lever pivots to operate the shear device.

* * * * *